Dec. 5, 1967  R. DE FILIPPIS  3,356,233
ROTATABLE PARKING APPARATUS FOR MOTOR VEHICLES
Filed Nov. 6, 1963  4 Sheets-Sheet 1

RAYMOND DE FILIPPIS
INVENTOR.

BY

ATTORNEY

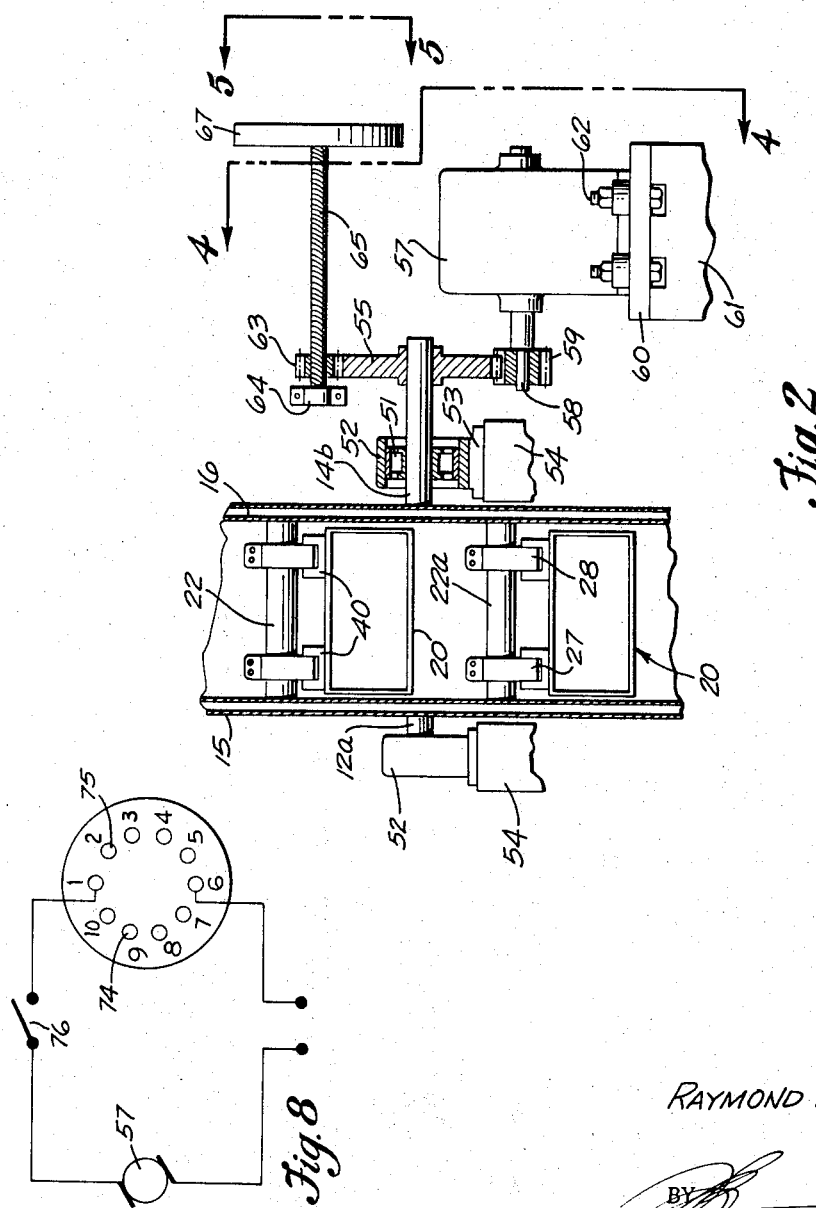

Dec. 5, 1967  R. DE FILIPPIS  3,356,233
ROTATABLE PARKING APPARATUS FOR MOTOR VEHICLES
Filed Nov. 6, 1963  4 Sheets-Sheet 3

RAYMOND DE FILIPPIS
INVENTOR.

ATTORNEY

RAYMOND DE FILIPPIS
INVENTOR.

ATTORNEY

United States Patent Office 3,356,233
Patented Dec. 5, 1967

3,356,233
ROTATABLE PARKING APPARATUS FOR
MOTOR VEHICLES
Raymond de Filippis, 97—28 57th Ave.,
Corona, N.Y. 11368
Filed Nov. 6, 1963, Ser. No. 321,940
5 Claims. (Cl. 214—16.1)

This invention relates to a parking or storage apparatus for motor vehicles, and is particularly directed to a rotatable apparatus, in which the vehicles are loaded at the street or floor level, a portion of the apparatus being rotated so that additional vehicles can be loaded, and unloaded.

A primary feature of the apparatus, is that the vehicles, when mounted in the rotatable portion of the apparatus, occupy a minimum of space, so that a large number of vehicles can be stored in the same general area.

Another feature is that the vehicles can readily be made available for unloading by rotating the rotatable portion of the apparatus to a particular position or station, thereby enabling an individual vehicle or vehicles to be removed from the storage apparatus, in a minimum of time.

A major feature of the invention is that the vehicles are so loaded that the rotatable portion of the apparatus is accurately balanced in any angular position, thus enabling the rotatable portion of the apparatus to be rotated by a relatively small motor, a reduction gear mechanism being provided to reduce the motor speed and facilitate stopping and starting the rotatable portion of the apparatus, preparatory to loading and unloading.

Another feature is that a dial and indicator combination, is provided, to indicate at all times the angular position of a particular compartment, supported by the rotatable portion of the apparatus, thus enabling a particular vehicle to be accurately rotated into the unloading position with a minimum of effort, and showing at all times the position of the compartments located in the loading and unloading position.

A primary feature of the invention is that the indicator arm, is diven by a flexible cable, directly connected to the reduction gear mechanism, the indicator dial being visible to the operator at all times, thus enabling him to move the individual vehicle to its unloading position in a minimum of time.

Another feature of the invention is that an individual compartment is provided for each of the vehicles, thus enabling the vehicles to be stored without interfering with one another.

The accompanying drawings, illustrative of one embodiment of the invention, together with the description of its construction and the method of operation, mounting and utilization thereof, will serve to clarify further objects and advantages of the invention.

In the drawings:

FIG. 1 is a partial vertical section and partial front elevational view of the rotatable portion of the apparatus, showing the wheel housing, the individual carriers supported by the wheel housing, the method of pivotally supporting the individual carriers, two of the carriers being shown at the floor level to facilitate loading and unloading of the vehicles.

FIG. 2 is a vertical section through the wheel housing shown in FIG. 1, showing the method of supporting the central shaft, the motor which is used for rotatably driving the central shaft, the reduction gear mechanism driven by the motor, and the method of driving the indicator arm of the indicator dial which indicates the momentary position of the wheel housing, and the carriers supported thereby.

FIG. 8 is a schematic wiring diagram showing the method of connecting the contacts on the indicator dial to the motor.

Figure 1:
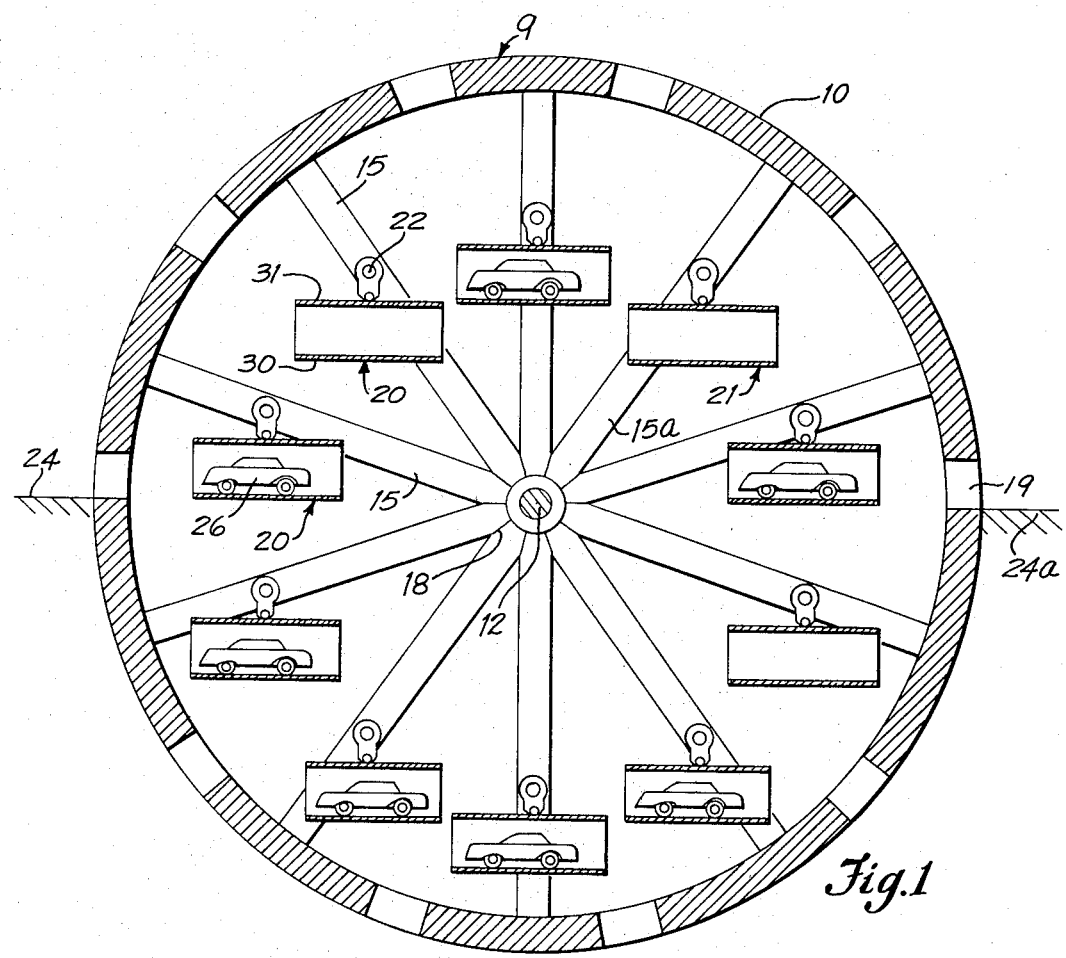

It will be understood that the following description of the construction and the method of support, mounting and operation of the rotatable parking apparatus for motor vehicle is intended as explanatory of the invention and not restrictive thereof.

In the drawings, the same reference numerals designate the same parts throughout the various views, except where otherwise inidcated.

Figure 3:
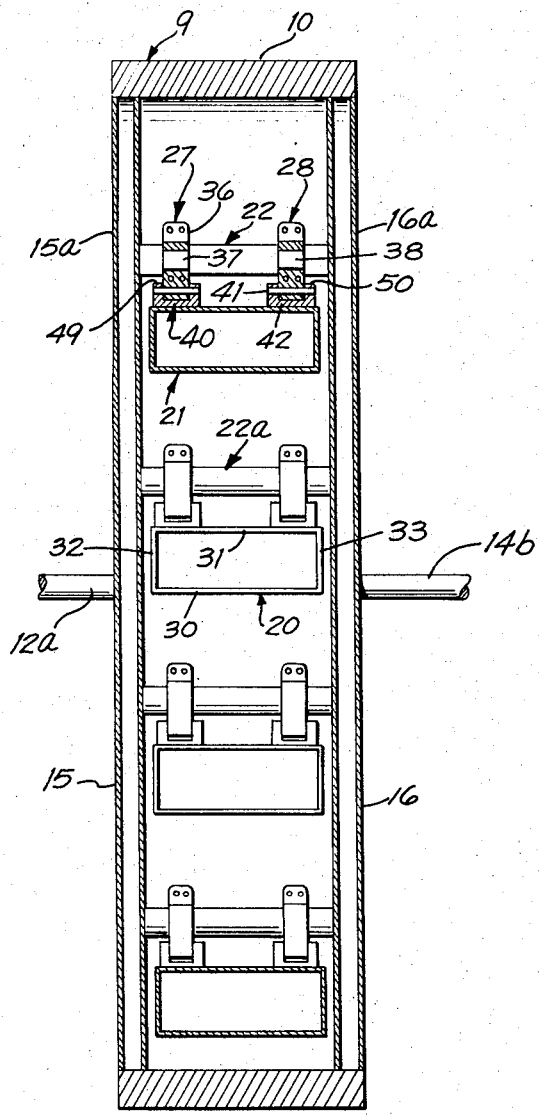
FIG. 3 is a vertical section through the wheel housing, shown in FIG. 1, showing the individual carriers and the method of pivotally supporting the individual carriers, relative to the wheel housing.

One embodiment of the construction shown in FIGS. 1, 2, and 3, comprises a central rotating member, or wheel huosing, consisting of an outer rim 10, of circular form, the outer rim being supported from a central shaft 12, by a plurality of pairs of radially positioned side members or spokes 15 and 16, as shown in FIGS. 1 and 3.

In the construction shown in FIG. 1, there are ten equally-spaced radially positioned side members or spokes located on each side of the wheel housing, the number of side members depending upon the outer diameter of the rim, and controlling the number of compartments or carriers 20, supported by the wheel housing.

The inner end of each of the side members, which are radially positioned is fixedly attached to the projecting portion 12a, 14b of the shaft, by welding, or other suitable means, the outer end of each of the side members being fixedly attached by welding or other suitable means to the rim, thereby supporting the rim.

The side members are each made of a hollow rectangular steel section, or of other suitable form, depending upon the outer diameter of the rim, and as shown at the center of FIG. 1, the inner end of each side of each of the side members 15, 16, adjacent the central shaft is chamfered at 18, to reduce the width of the side members and enable them to be attached to one another and to the projecting end of the central shaft 12.

The rim 10 has a plurality of equally-spaced, radially positioned openings 19 of rectangular, or other suitable contour therethrough, each of the openings being aligned with one of the carriers 20, in the central or loading position, shown in FIG. 1, to permit a vehicle to pass from the ground or floor level 24, 24a to the corresponding carrier through the intermediary of a bridging apparatus (not shown) such as is disclosed by the Blackham et al. Patent 1,619,966.

As shown in FIG. 3, a plurality of hanger shafts 22, 22a is supported by the side members 15, 16, one hanger shaft being located between each pair of side members 15a, 16a each of the ends of each hanger shaft being fixedly attached to the corresponding side member by welding, a suitable bracket, or other suitable attaching means.

As shown in FIGS. 1, and 3, a carrier or compartment 20, 21, is pivotally supported by each of the hanger shafts, the carrier or compartment being operative to support one of the vehicles 26, in the manner shown in FIG. 1.

Figure 6:
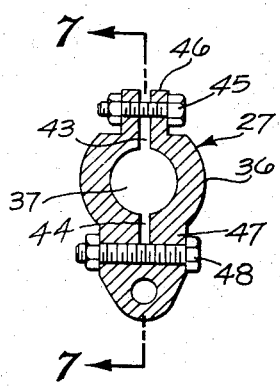
FIG. 6 is a front elevational view of one of the carrier hangers shown in FIG. 1, showing the method of pivotally supporting each of the carriers.
Figure 7:
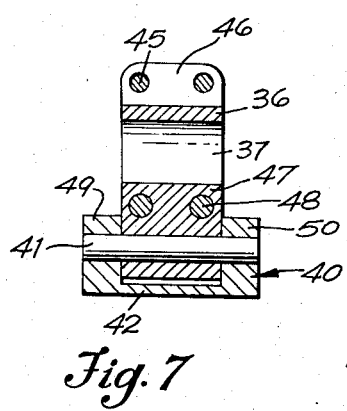
FIG. 7 is a vertical section through one of the carrier hangers, shown in FIG. 6, the section being taken on the line 7—7, FIG. 6.

Each of the carriers is supported by a pair of pivot hangers 27, 28, shown in FIG. 3 and in greater detail in FIGS. 6 and 7.

Each of the carriers 20, 21, which is of rectangular cross-section, consists of a bottom wall 30, which supports one of the vehicles, and a top wall 31, which is substantially parallel to the bottom wall, a pair of side walls 32, 33 being located between the top and bottom walls, each of the side walls being fixedly attached by welding, or other suitable means to the top and bottom walls.

As shown in FIG. 1, both ends of each of the carriers are open, to facilitate loading and unloading a motor vehicle on each carrier, when the carrier is in the loading position, shown in FIG. 1.

Each of the hangers 27 and 28 consists of a support section 36, which is pivotally attached to a reduced diameter section 37, 38 of each of the hanger shafts 22, as shown in FIG. 7, and a lower bracket 40, which is supported by a pivot pin 41, the base section 42, of the lower bracket being fixedly attached to the top wall of the carrier by bolts or other suitable attaching means, thereby pivotally supporting the carrier 20, 21.

As shown in FIG. 6, the upper portion of the support section 36 of each of the hangers is split along the line 43, 44, to enable each of the support sections to fit over the corresponding reduced diameter section of the hanger shaft, a pair of bolts 45, clamping the upper flanges 46 of the support section to one another, the lower flanges 47, of each of the hangers being attached to one another by another pair of bolts 48. The bolts 45, 48, are tightened in such a manner as to retain the support section against the reduced diameter section 37, 38, of the hanger shaft and still allow the support section to swing to the required extent relative to the reduced diameter section of the hanger shaft.

Each of the lower brackets 40 which is pivotally supported by the support section, consists of a flat base 42, and a pair of side bosses, each of the side bosses 49, 50 having an opening therethrough to receive a pivot pin 41, which extends through an opening on the lower portion of the support section, thereby pivotally supporting the lower bracket 40, and the carrier 20, 21 to which it is attached.

When a vehicle is moved into the carrier 20, 21 in the loading position, shown in FIG. 1, from the floor line or street level 24, 24a shown in FIG. 1, the wheels of the vehicle are chocked and the axles thereof fastened to the bottom wall of the carrier by hooks or other suitable means, thereby restraining the vehicle from movement relative to the carrier when the carrier is moved from the loading position shown in FIG. 1, to any of the other suspended positions shown in FIG. 1.

FIG. 2 shows the method of supporting and rotating the projecting portions 12a, 14b of the shaft, each projecting end of which is supported by a roller bearing, or other type of pillow block, which consists of a housing section 52, and a base section 53, which is integral with or attached to the housing section, the base section being supported by a pedestal 54, which is supported by the building or other structure in which the apparatus is mounted, a roller or other type of bearing 51 being supported by the interior of the housing section 52, the inner race of the bearing being fitted to the projecting section 12a, 14b of the central shaft 12, thereby allowing the central shaft and the wheel housing 9 supported thereby to be rotated.

As shown in FIG. 2, a drive gear 55 is attached to the right-hand projecting section 14b of the central shaft 12, the drive gear being keyed, or otherwise directly attached to the projecting section of the central shaft 12.

An electrically driven motor 57 is mounted below the drive gear 55, the motor having a rotating shaft 58 projecting beyond one end thereof, a drive pinion 59 being attached, by keying or other suitable means to the free end of the motor shaft, the drive pinion meshing with the drive gear thereby driving the drive gear 55, and the projecting section of the central shaft, to which the drive gear 55 is attached, at a reduced speed relative to the motor. By reducing the speed of the central shaft relative to the motor shaft, the central shaft and the wheel housing supported thereby can be rotated through a portion of a revolution, thereby moving the carrier from the loading position, shown in FIG. 1, to one of the storage positions shown in FIG. 1, and in the same manner moving the selected carrier from the storage position, to the loading, or unloading position shown in FIG. 1.

The motor 57 is supported by a pedestal 61, or other suitable means supported by the building or other structure on which the apparatus is mounted. A plate section 60 attached to the pedestal 61 is attached to the base of the motor, by a plurality of bolts 62 or other suitable attaching means, thereby rigidly supporting the motor 57.

Figure 4:
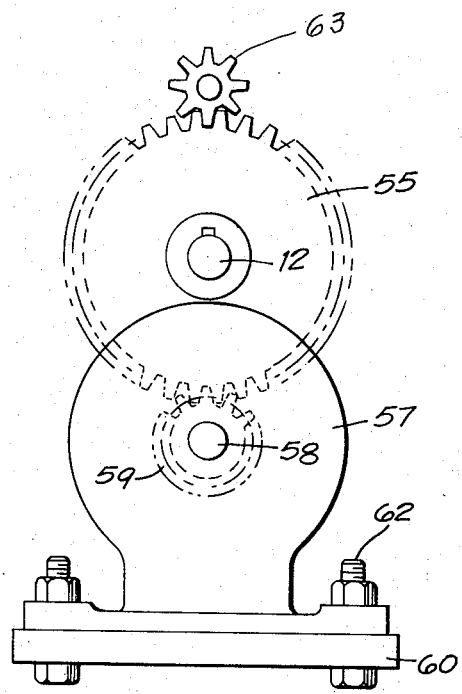
FIG. 4 is a partial vertical section and partial side elevational view of the motor and the reduction gear mechanism shown in FIG. 2, the section being taken on the line 4—4, FIG. 2.

As shown in FIGS. 2 and 4, a dial indicator drive pinion 63, is mounted adjacent and meshes with the shaft drive gear 55, the pinion which is supported by a bracket 64, drives a flexible cable 65, which is attached to and rotatably drives the indicator 66 of an indicator dial 67, which is located remotely relative to the rotatable wheel housing 9, in full view of the operator of the apparatus. The indicator dial 67 has a pluarlity of numerals 68, painted or otherwise reproduced on the face of the dail.

Figure 5:
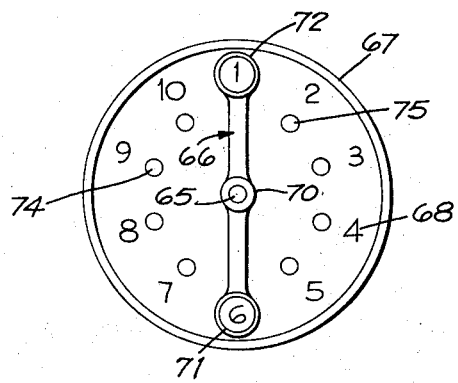
FIG. 5 is a front elevational view of the indicator dial, shown in FIG. 2, showing the indicator arm which indicates the position of the selected pair of carriers supported by the wheel housing, on the indicator dial, the view being taken on the line 5—5, FIG. 2.

The number of numerals 68 on the face of the indicator dial, ten shown in FIG. 5, is equal to the number of carriers 20, 21 mounted on the wheel housing, and shown in FIG. 1, each of the carriers carrying a numeral designation which corresponds to one of the numerals on the indicator dial 67, thereby showing the position of a particular pair of carriers in the loading and unloading position.

The hub 70, at the center of the indicator is attached to the free end of the flexible cable shown in FIG. 2, which is driven by the pinion 63, thus rotating the indicator to a position corresponding with the momentary position of the wheel housing 9.

Each of the two ends of the rotating indicator 66 has a circular or other form of indicator ring 71, 72 integral therewith, the indicator rings indicating a pair of numerals, corresponding to the two carriers in the loading position shown in FIG. 1.

The indicator thus enables the operator, by rotating the wheel housing 9 to a position corresponding with any selected diametrically opposite pair of numerals on the indicator dial, to move any pair of carriers to the loading and unloading position, thereby enabling a selected individual vehicle or a pair of vehicles to be removed from the individual carriers mounted on the wheel housing.

After that the wheel housing 9 can again be rotated to any desired position, thereby moving the carriers from the loading position to any of the other storage positions shown in FIG. 1.

FIG. 8 represents a fragmentary schematic wiring diagram, showing diagrammatically the method of connecting the contacts mounted on the indicator dial, to the motor.

A plurality of contacts, for example contacts, 74, 75, is mounted on the face of the indicator dial, the contacts being so positioned diametrically opposite each other so that when one of the indicator rings 71, 72, on the ends of the indicator reaches one pair of numerals 68, on the face of the indicator dial, it engages one pair of diametrically opposite contacts on the indicator dial. These contacts are connected to a relay, circuit breaker, or switch 76, shown in FIG. 8, which is directly connected to the motor. When a pair of contacts are bridged the switch 76 is opened. In FIG. 8 only the connection is established when the indicator bridges the contacts for positions one and six of FIG. 5.

The pairs of contacts 74, 75 and dial 67 are mounted on a control panel, not shown, under control of the operator, who selects the pair of contacts at which the motor 57 driving the wheel housing is to be stopped.

By connecting a light or other signal, not shown, to the contacts on the indicator dial, the indicator dial would show which carriers are loaded, and which are empty.

In loading the carriers in sequence, the indicator arm would show the next pair of carriers which are empty and available for loading.

Thus when the indicator arm reaches the selected position, relative to the dial of the indicator, the motor is automatically shut off, thus retaining the wheel housing at the selected position, and in that manner enabling the selected pair of vehicles to be removed from or loaded on the selected pair of carriers.

After the vehicles are loaded on the selected pair of carriers, the operator may actuate an auxiliary switch, which bypasses the contacts 74, 75, thereby enabling the wheel housing to be moved to any other selected position or station.

While the diameter of the outer rim 10 of the wheel housing 9 is controlled by the number of carriers, or vehicles supported by the wheel housing, the diameter of the outer rim of the wheel housing would normally be about fifty feet.

The number of carriers supported by the wheel housing would depend upon the diameter of the wheel housing. It would normally be established at ten or twelve equally-spaced carriers, the number being an even number to assure accurate balance of the wheel housing, in all positions, when vehicles are mounted on carriers on opposite sides of the wheel housing.

In order to reduce the load on the motor, the operator would exercise care in loading an equal number of vehicles on both sides of the wheel housing.

In the event this is difficult, a dummy vehicle may be provided to enable a dummy vehicle to be mounted on the carrier on one side, to balance the weight of the vehicles on the opposite side.

The outer rim 10 of the wheel housing, shown in FIGS. 1 and 3, would be made of a steel plate, or other suitable material to protect the outer diameter of the wheel housing.

The side members 15, 16 of the wheel housing, may be made of steel of hollow rectangular cross-section, or other suitable cross-section, depending upon the diameter of the wheel housing, and the load to be carried by a particular wheel housing 9.

The pillow blocks supporting the central shaft may be equipped with roller bearings, ball-bearings, or other suitable type of bearings depending upon the load imposed on the pillow blocks.

The gear train driving the central shaft may be composed of spur gears, as shown in FIGS. 2 and 4, helical gears, herringbone gears or other suitable gear train depending upon the load on the gear train.

Instead of the spur gears, a worm gear train may be substituted.

Where the unit is mounted at street level, the center of the wheel housing 9 is located at approximately street level, the lower portion of the wheel housing being located underground.

Where the wheel housing 9 is mounted on a floor above the ground level, the center of the wheel housing is located at the loading floor level. A ramp or other suitable elevating means would be provided from the street level to enable the vehicles to reach the loading floor level.

The diameter of the wheel housing would depend upon the number of vehicles or vehicle carriers supported by the wheel housing. Thus provision may be made for four or more vehicles, and carriers, and up to 12 or more carriers or vehicles, depending upon the diameter of the wheel housing.

The actual diameter of the outer rim of the wheel housing would depend upon the space available at a particular location, and the number of vehicles to be accommodated.

Where space is available, additional wheel housings may be mounted side by side, each wheel housing being separately driven by an individual motor, each unit having a separate dial indicator controlled thereby.

In the construction shown in FIGS. 1, 2 and 3, a total of ten or twelve vehicles can be parked or stored in the normal floor area occupied by six vehicles, thereby sharply reducing the space required for parking or storing vehicles.

It will be apparent to those skilled in the art that the present invention is not limited to the specific details described above and shown in the drawings, and that various modifications are possible in carrying out the features of the invention and the construction, operation, actuation, and the method of installation and utilization thereof, without departing from the spirit and scope of the appended claims.

What is claimed is:

1. A parking mechanism for motor vehicles, comprising a rotary substantially tubular wheel housing, a drive shaft mounted at the axial center of said tubular housing, a plurality of radially positioned side members located between the central shaft and the inner diameter of the wheel housing, means attaching the ends of the side members to the tubular housing and the drive shaft respectively, means rotatably driving the drive shaft, a plurality of carrier supports located between the side members, each carrier support being located between and fixedly attached to a pair of side members, pivoted hanger means supported on each of said carrier support and a carrier suspended from each support by said hanger means, each of said carriers being operative to receive and support a motor vehicle, each carrier being disposed within the periphery of said wheel housing, an opening in said tubular housing adjacent each carrier to permit movement of a vehicle along a path corresponding substantially to a radial line of the wheel housing into a respective carrier and out of said carrier in said wheel to and from a loading-unloading level, and said level and the axis of rotation of said wheel housing being disposed substantially in a common plane.

2. A parking mechanism for motor vehicles, as in claim 1, in which the central shaft projects beyond both sides of the tubular housing, and including means rotatably supporting the projecting portions of the central shaft.

3. A parking mechanism, as in claim 1, in which a portion of the central shaft projects beyond each side of the tubular housing, means rotatably supporting each projecting portion of the central shaft, and means attached to one projecting end of the central shaft operative to rotatably drive the central shaft.

4. A parking mechanism for motor vehicles, as in claim 1, in which each carrier support comprises a support shaft located between each pair of side members and fixedly attached thereto, each pivoted hanger means including a support member pivotally attached to the support shaft, and means pivotally attached to each support member fixedly attached to one of the carriers to pivotally support the carrier.

5. A parking mechanism for motor vehicles, as in claim 1, in which the central shaft projects beyond both ends of the tubular housing, means rotatably supporting the projecting portions of the central shaft, a drive gear fixedly attached to one projecting end of the central shaft, a reduction gear mechanism operative to rotatably drive said drive gear, and a motor driving said reduction gear mechanism.

References Cited

UNITED STATES PATENTS

| | | | |
|---|---|---|---|
| 329,898 | 11/1885 | Girouard | 214—16.1 |
| 1,269,414 | 6/1918 | Fitterling | 198—158 X |
| 1,619,966 | 3/1927 | Blackham et al. | 214—16.1 |
| 1,800,059 | 4/1931 | Egan | 214—16.12 |
| 1,940,867 | 12/1933 | James et al. | 214—16.12 |
| 2,113,308 | 4/1938 | Morton | 214—16.12 |
| 2,670,860 | 3/1954 | Cogings | 214—16.1 |
| 2,738,885 | 3/1956 | Demaline | 214—16.1 |
| 2,838,187 | 6/1958 | Schulte | 214—16.1 |
| 2,901,130 | 8/1959 | Thomas | 214—16.12 |
| 2,927,545 | 3/1960 | Hieb | 198—211 X |
| 2,945,603 | 7/1960 | McGuinness | 214—16.12 |
| 3,033,390 | 5/1962 | Gronvold | 214—16.12 |
| 3,153,488 | 10/1964 | Mori | 214—16.12 |

GERALD M. FORLENZA, *Primary Examiner.*

R. B. JOHNSON, *Assistant Examiner.*